US 9,260,060 B2

(12) United States Patent
Matsubara

(10) Patent No.: US 9,260,060 B2
(45) Date of Patent: Feb. 16, 2016

(54) TONNEAU BOARD

(71) Applicant: TOYOTA BOSHOKU KABUSHIKI KAISHA, Aichi-ken (JP)

(72) Inventor: Kazuto Matsubara, Kariya (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 14/737,887

(22) Filed: Jun. 12, 2015

(65) Prior Publication Data
US 2015/0375682 A1 Dec. 31, 2015

(30) Foreign Application Priority Data
Jun. 27, 2014 (JP) .................................. 2014-132629

(51) Int. Cl.
*B60R 5/04* (2006.01)
(52) U.S. Cl.
CPC ...................................... *B60R 5/044* (2013.01)
(58) Field of Classification Search
CPC .......... B60R 5/04; B60R 5/044; B60R 5/045; B60R 5/047; B60R 5/048
USPC .......... 296/24.4, 24.43–24.45, 37.16, 136.03, 296/136.04
See application file for complete search history.

(56) References Cited

U.S. PATENT DOCUMENTS

| | | | | |
|---|---|---|---|---|
| 4,480,765 A * | 11/1984 | Tonus | ................... | A01C 7/042 221/211 |
| 7,641,256 B2 * | 1/2010 | Kodaira | ................. | B60R 5/048 296/37.1 |
| 7,934,761 B2 * | 5/2011 | Buehl | ...................... | B60R 7/02 296/37.1 |
| 8,172,296 B2 * | 5/2012 | Umeda | ................... | B60R 5/045 296/24.43 |
| 8,628,133 B2 * | 1/2014 | Honda | ................... | B60R 5/044 296/24.43 |
| 2011/0241372 A1 * | 10/2011 | Kusu | ...................... | B60R 5/048 296/24.43 |
| 2013/0020825 A1 * | 1/2013 | Yamada | ................. | B60R 5/044 296/37.16 |
| 2014/0175821 A1 * | 6/2014 | Cassiani | ................. | F16G 11/03 296/24.44 |

FOREIGN PATENT DOCUMENTS

JP 2003-246241 2/2003

* cited by examiner

*Primary Examiner* — Gregory Blankenship
(74) *Attorney, Agent, or Firm* — Greenblum & Bernstein, P.L.C.

(57) ABSTRACT

A tonneau board used in a luggage space and movable according to opening and closing of a back door of a vehicle is provided. The tonneau board includes a rear board, a hinge portion, a front board, and an elongated connecting member. The rear board is disposed in front of the back door and includes a connect portion in a vehicular front portion thereof. The front board is in front of the rear board and connected to the rear board via the hinge portion to be pivotable around the hinge portion. The connecting member has flexibility and is configured to connect the rear board and the back door and includes a loop connected to the front portion of the rear board via the connect portion.

11 Claims, 9 Drawing Sheets

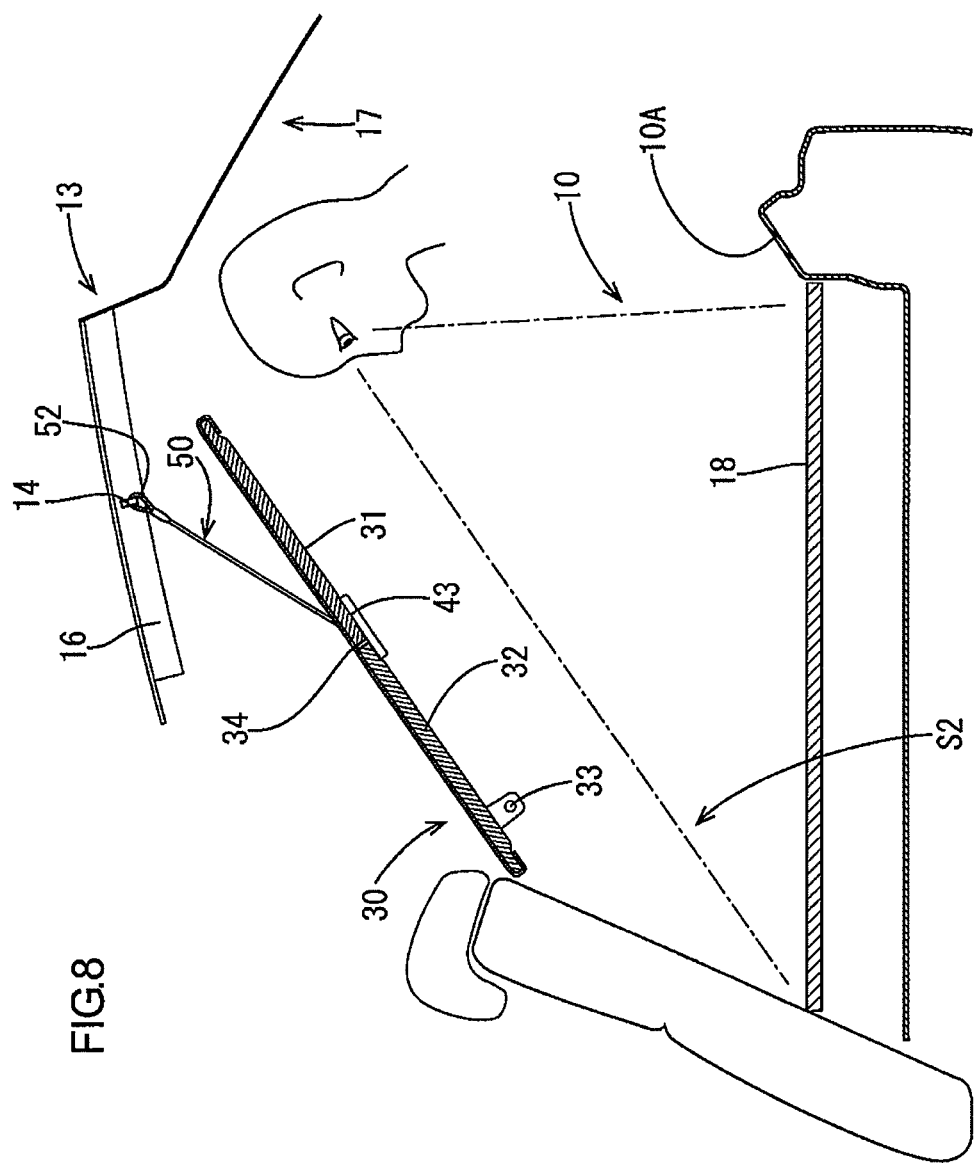

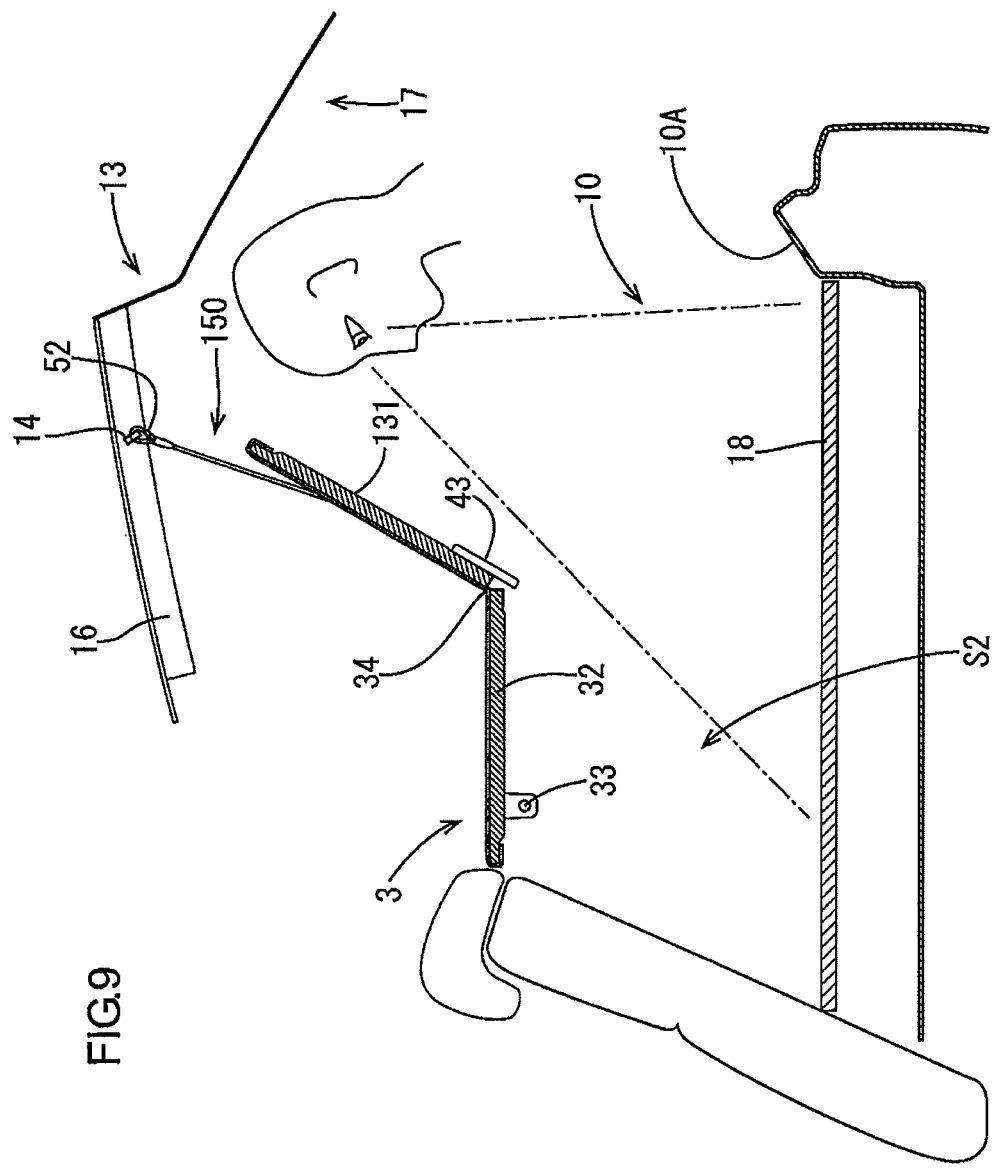

TONNEAU BOARD

CROSS REFERENCE TO RELATED APPLICATION

This application claims priority from Japanese Patent Application No. 2014-132629 filed Jun. 27, 2014. The entire contents of the priority application are incorporated herein by reference.

TECHNICAL FIELD

The present disclosure relates to a tonneau board.

BACKGROUND

A tonneau board to be disposed in a luggage space of a vehicle has been known. Such a tonneau board (a rear package tray) includes two boards that are arranged in a front-rear direction of the vehicle. The two boards are connected via a hinge portion so that the two boards pivot relative to each other around the hinge portion.

One of the boards arranged on the rear of the vehicle is connected to a back door of the vehicle via connecting members (suspending ropes). Specifically, a vehicular rear edge of the board on the rear side is connected to the back door. When the back door is opened, the board on the rear side of the tonneau board is lifted up.

In the above configuration, when the back door is opened, the board on the rear side pivots around the hinge portion relative to the board on the front side and is lifted upward. Although the board on the rear side is lifted up, the board on the front side is not effectively lifted up. In this configuration, it is hard for a person to see the luggage placed under the board on the front side.

The present technology is accomplished in view of the above situations and an objective of the present technology is to provide a tonneau board including at least two boards each of which is lifted when a back door is opened.

SUMMARY

To solve the above problems, a tonneau board used in a luggage space and movable according to opening and closing of a back door of a vehicle includes a first board, a hinge portion, a second board, and an elongated connecting member. The first board is to be disposed in front of the back door and includes a connect portion in a vehicular front portion thereof. The second board is in front of the first board and connected to the first board via the hinge portion to be pivotable around the hinge portion. The connecting member is configured to connect the first board and the back door and includes an end portion connected to the first board via the connect portion.

BRIEF DESCRIPTION OF THE DRAWINGS

FIG. 8 is a cross-sectional view of the rear portion of the vehicle when the back door is in an open position.

FIG. 9 is a cross-sectional view of a rear portion of a vehicle including a tonneau board according to a comparative example when a back door of the vehicle is in an open position.

DETAILED DESCRIPTION

Figure 1:
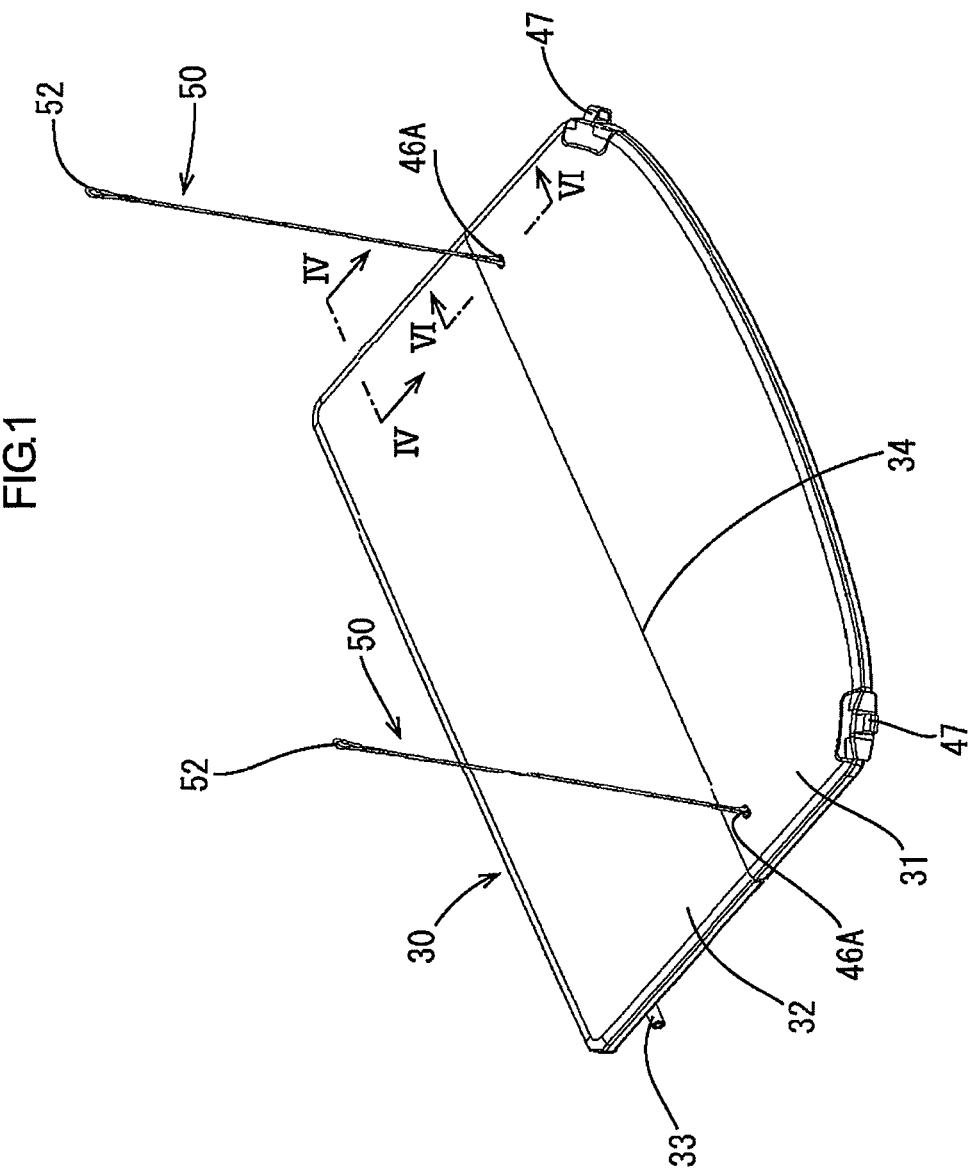
FIG. 1 is a perspective view of a tonneau board according to an embodiment of the present technology.

An embodiment will be described with reference to FIGS. 1 to 9. FIG. 1 is a perspective view of a tonneau board 30 (a package tray) according to this embodiment. As illustrated in FIG. 7, the tonneau board 30 is configured to be disposed in a luggage space 10 of a vehicle provided in front of a back door 13 of the vehicle. The back door 13 is configured to cover an opening 10A of a body of the vehicle from a vehicular rear side. The tonneau board 30 is used to divide the luggage space 10 into an upper space and a lower space and to conceal luggage placed in the luggage space 10 from the outside of the vehicle.

An upper end of the back door 13 is connected to the body of the vehicle at an edge of the opening 10A via hinges (not illustrated) and thus the opening 10A is covered and uncovered by the back door 13 according to closing and opening of the back door 13. The back door 13 is configured to be moved between a closed position and an open position. In the closed position, the back door 13 is closed and covers the opening 10A (the position in FIG. 7). In the open position, the back door 13 is open and uncovers the opening 10A (the position in FIG. 8).

As illustrated in FIG. 1, the tonneau board 30 includes a rear board 31 (a first board), a front board 32 (a second board), and connecting members 50 that connect the rear board 31 to the back door 13. The rear board 31 and the front board 32 are connected via a hinge portion 34. The front board 32 and the rear board 31 are arranged in a vehicular front-rear direction. Each of the rear board 31 and the front board 32 has a rectangular board-like shape that is elongated in a vehicular width direction. In FIG. 1, an upper left side is a vehicular front side and a lower right side is a vehicular rear side, and the vehicular width direction is along a long side of each of the rear board 31 and the front board 32.

When the back door 13 is in the closed position as illustrated in FIG. 7, the rear and front boards 31, 32 are arranged such that plate surfaces thereof are parallel to the horizontal plane, more specifically, arranged with top plate surfaces of the respective rear and front boards 31, 32 facing an upper side. In the following descriptions, a top side and an upper side correspond to the upper side in the vertical direction and a bottom side and a lower side correspond to a lower side in the vertical direction.

Figure 2:
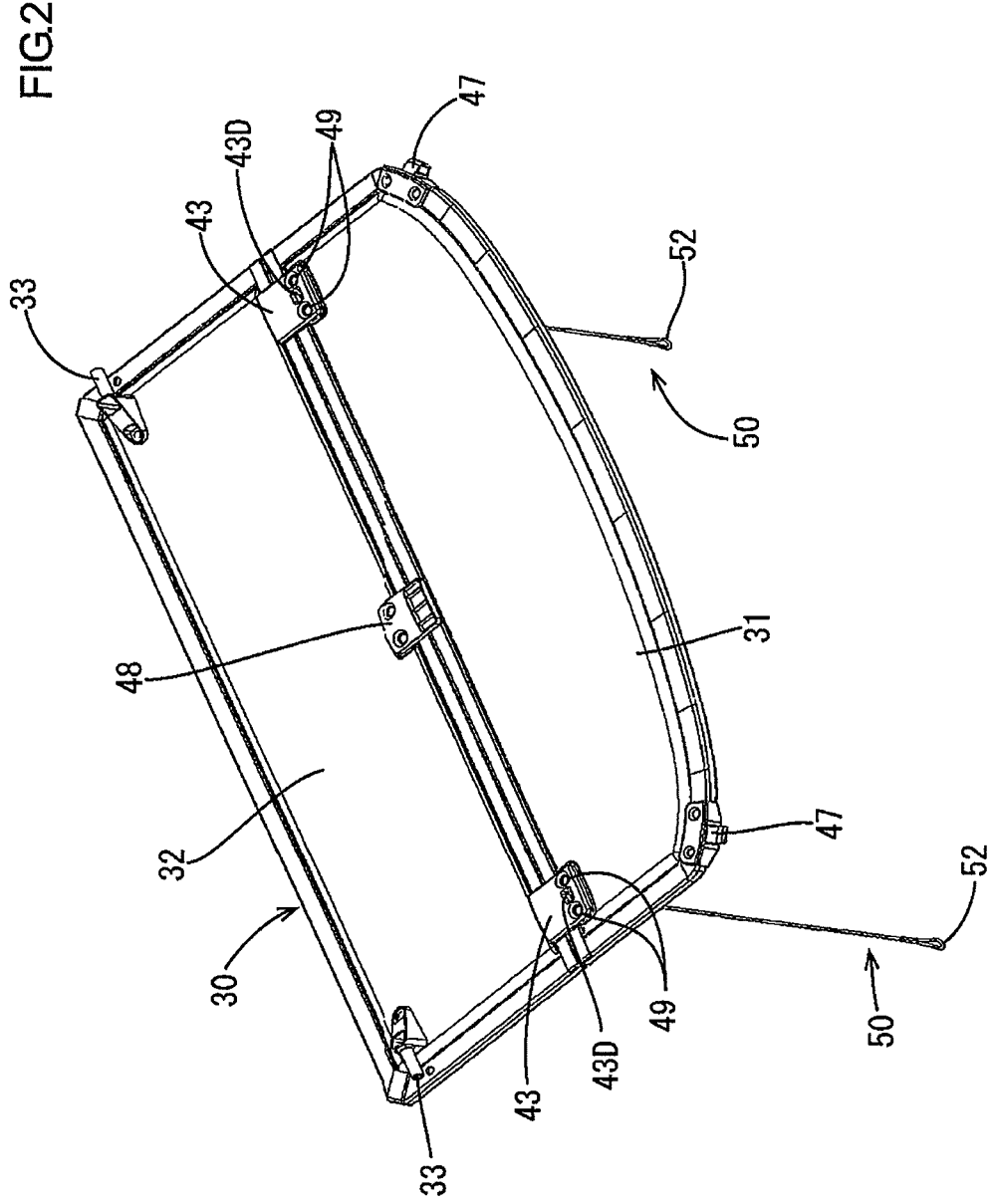
FIG. 2 is a perspective bottom view of the tonneau board in FIG. 1.

The front board 32 corresponds to a vehicular front portion of the tonneau board 30. As illustrated in FIG. 2, the front board 32 includes shafts 33 on a bottom surface 32B thereof, and specifically, the shafts 33 are provided in a vehicular front edge portion of the bottom surface 32B and provided near two side edge portions of the front board 32 in a vehicular width direction, respectively. The shafts 33 laterally extend from the two side edge portions of the front board 32 (outward in the vehicular width direction or toward a vehicular exterior side).

Figure 3:
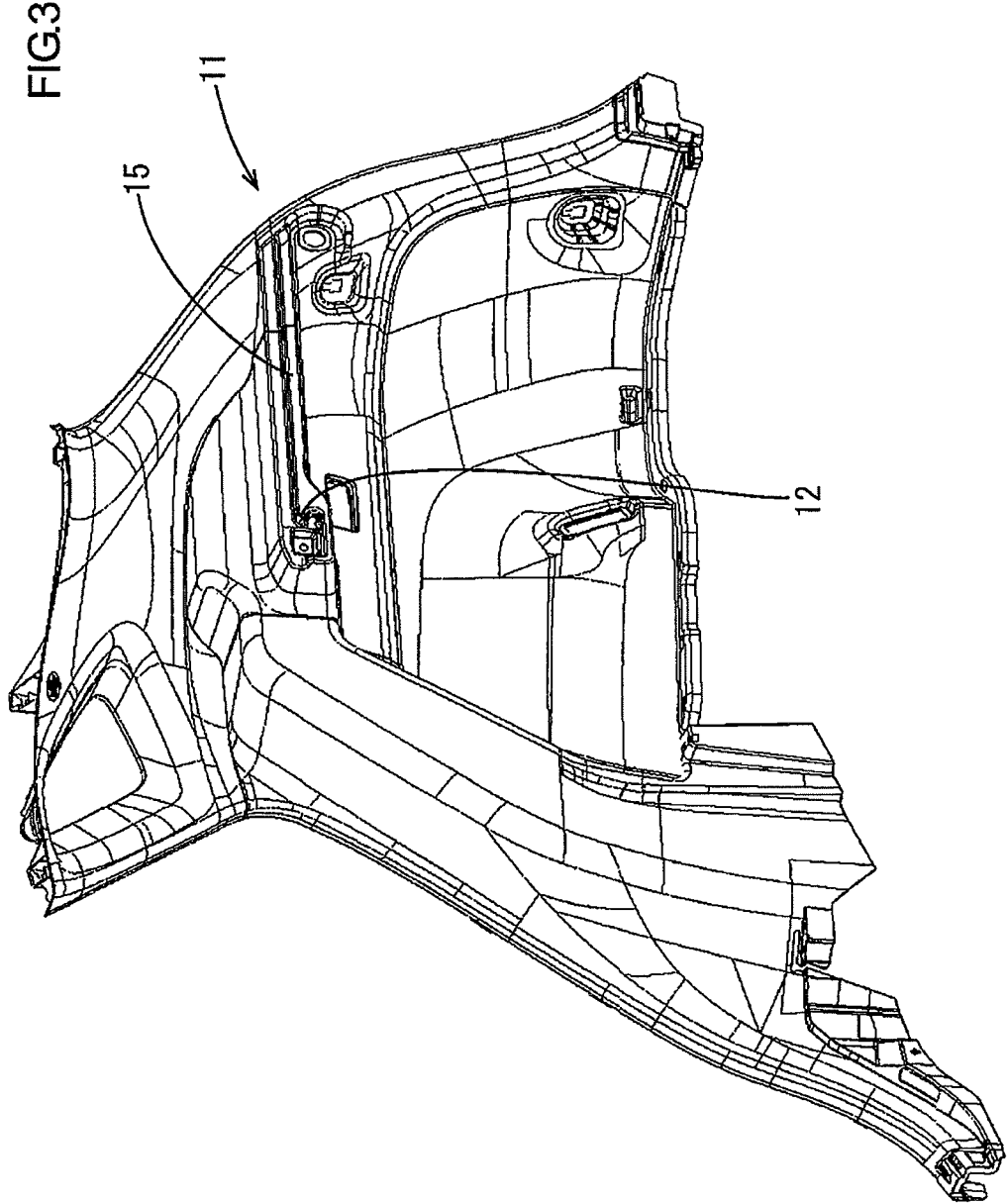
FIG. 3 is a perspective view of a side trim to which the tonneau board is to be mounted.

As illustrated in FIG. 3, a side trim 11 (a deck side trim) that constitutes a side wall of the luggage space 10 includes a recessed portion 12 in which the corresponding shaft 33 is fitted. Two side trims 11 are arranged on the respective sides of the luggage space 10 in the vehicular width direction.

The side trims 11 include support portions 15, respectively. The support portions 15 are configured to support the rear board 31 and the front board 32 at their side edge portions in the vehicular width direction (side edge portions). The support portion 15 protrudes from a main surface of the side trim 11 toward a vehicular interior side in the vehicular width direction and extends horizontally in the vehicular front-rear direction. The side edge portions of the rear and front boards 31, 32 are placed on the support portions 15. When the back door 13 is in the closed position, the rear and front boards 31, 32 are on the support portions 15, namely, supported by the support portions 15 to be maintained in a horizontal state.

Figure 4:
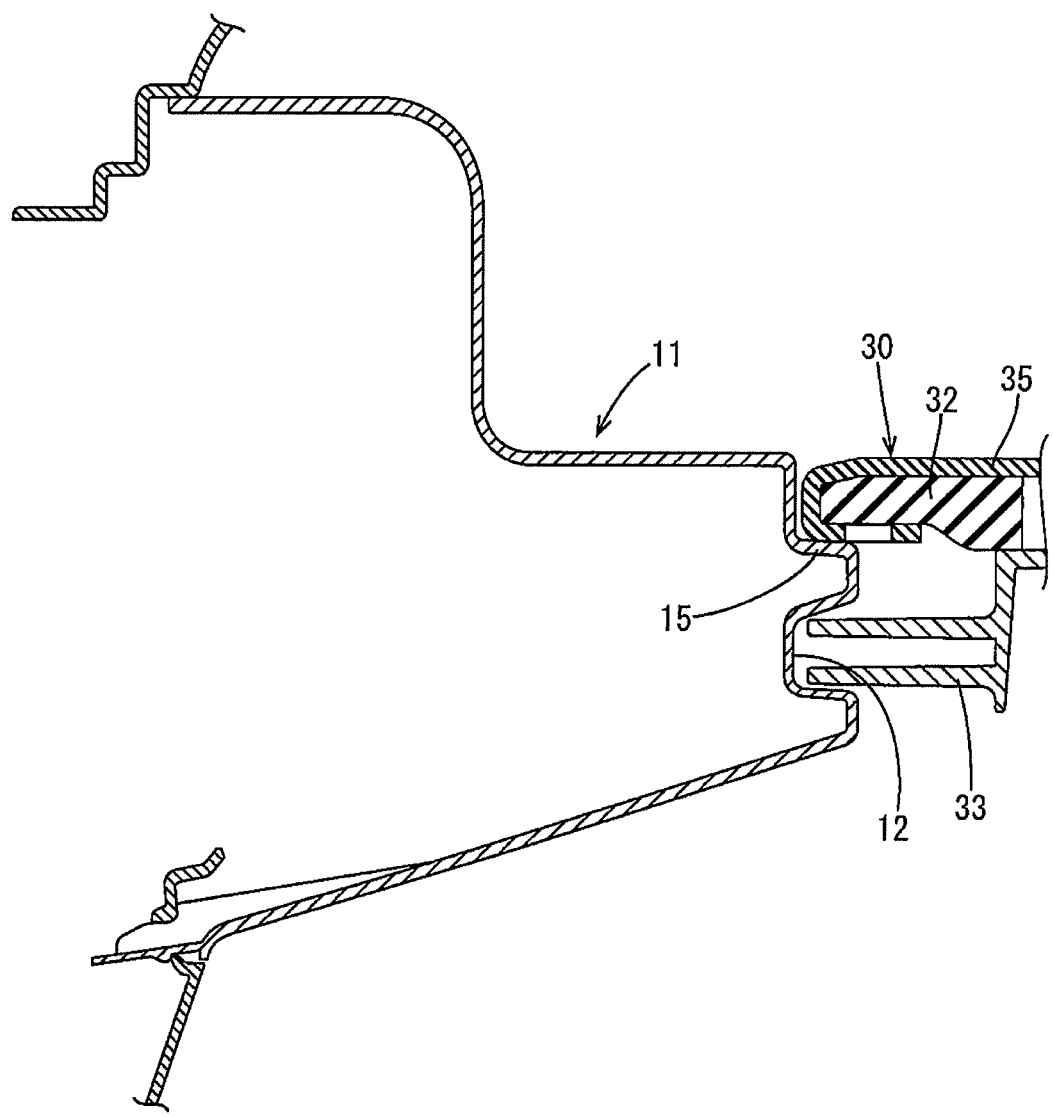
FIG. 4 is a cross-sectional view of the side trim and the tonneau board cut along line IV-IV in FIG. 1 while the tonneau board is mounted to the side trim.

As illustrated in FIG. 4, the shafts 33 are fitted in the respective recessed portions 12 such that the front board 32 pivots around the shafts 33. Accordingly, the tonneau board 30 is moved to be in a horizontal position and in a forward inclined position. In the horizontal position, the tonneau board 30 is on the support portions 15. In the forward inclined position, as illustrated in FIG. 8, the tonneau board 30 is inclined such that a front edge thereof is in the lowest position and a rear end thereof is in the highest position. The recessed portions 12 are below the respective support portions 15 and recessed toward the vehicular exterior side in the vehicular width direction. Each recessed portion 12 includes at least an upper wall.

As illustrated in FIG. 7, the rear board 31 is on the vehicular rear side with respective to the front board 32 (the right in FIG. 7) and on the vehicular front side with respect to the back door 13 that is in the closed position. The rear and front boards 31 and 32 are adjacent to each other.

Figure 6:
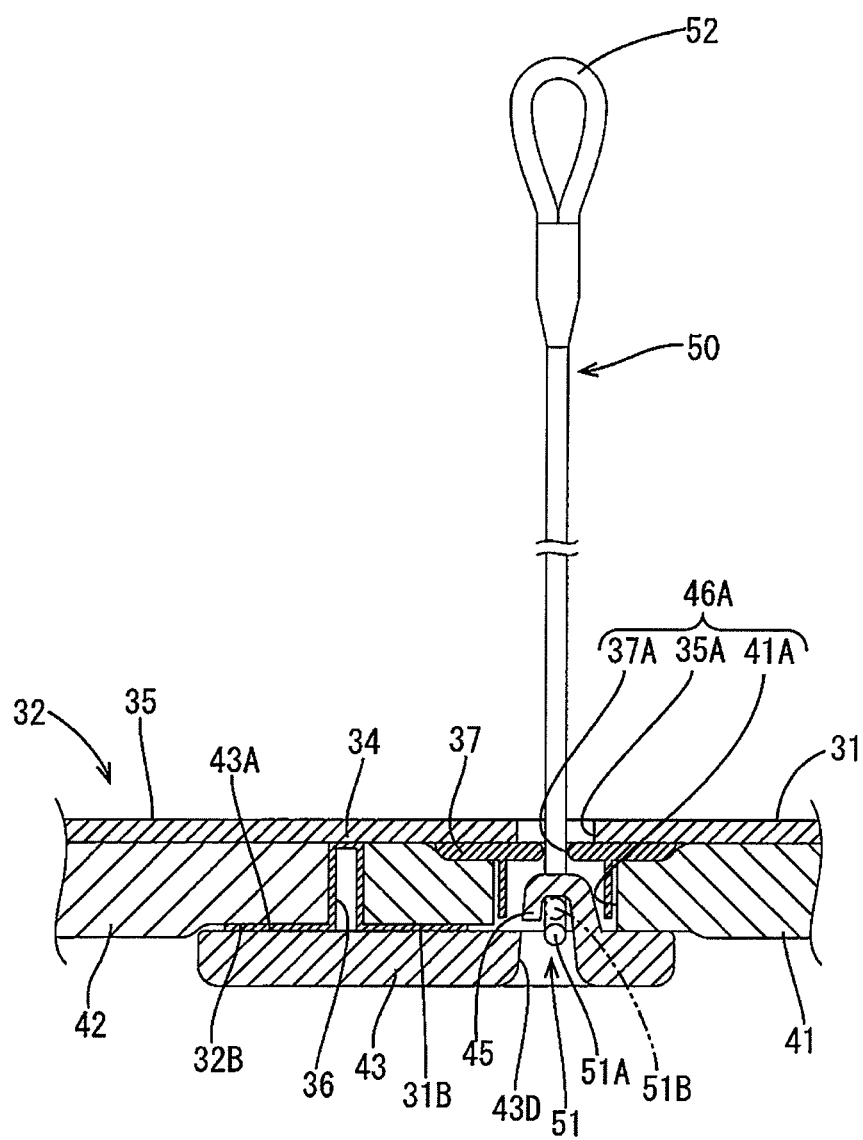
FIG. 6 is a cross-sectional view of the tonneau board cut along line VI-VI in FIG. 1.
Figure 7:
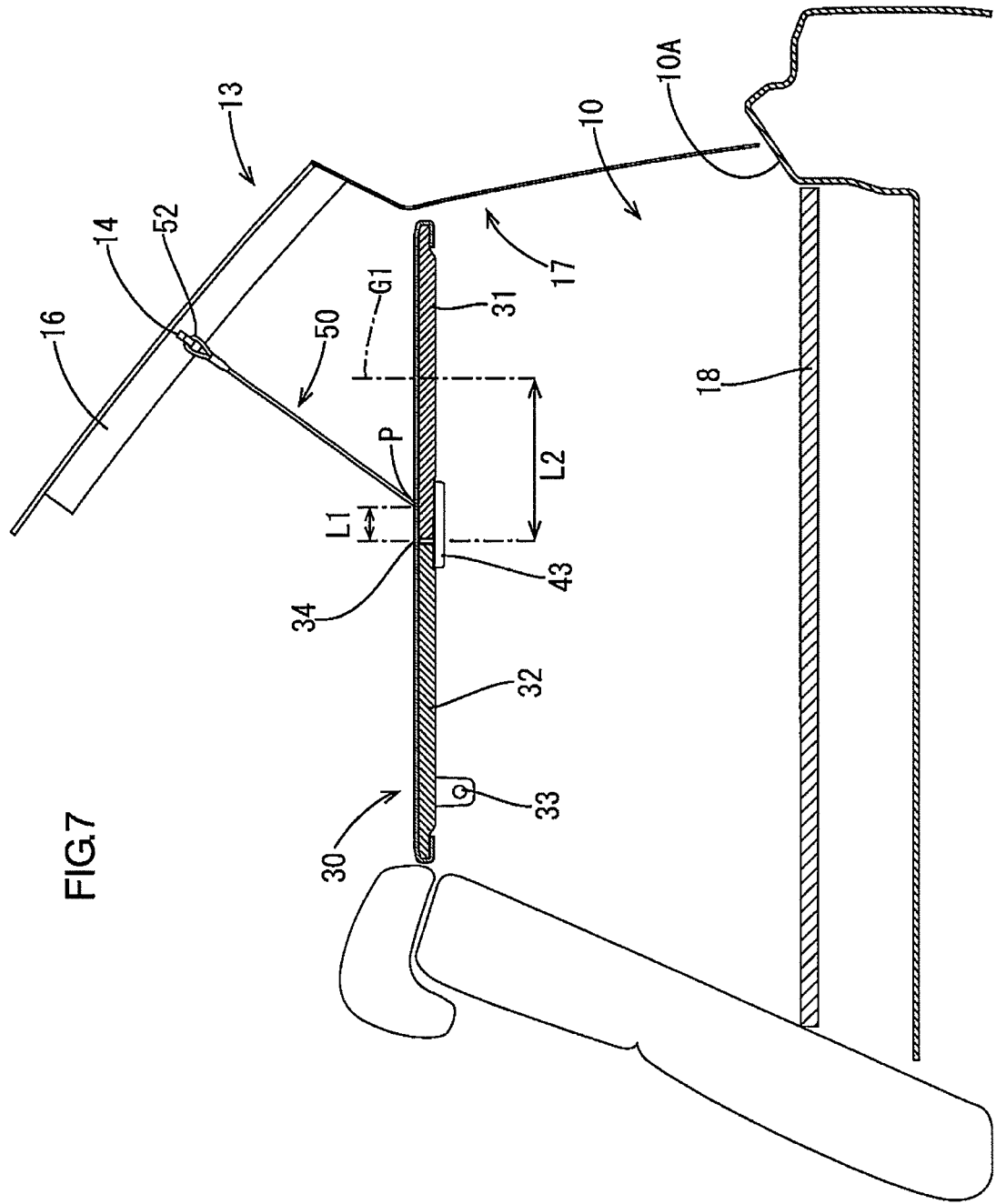
FIG. 7 is a cross-sectional view of a rear portion of a vehicle including a luggage space when a back door is in a closed position.

As illustrated in FIG. 6, the rear board 31 includes a base board 41 and the front board 32 includes a base board 42. A skin 35 having flexibility is attached to top surfaces of the respective base boards 41 and 42. The base boards 41 and 42 may be made of synthetic resin.

The skin 35, which has flexibility and is attached to the base board 41 and the base board 42, connects the base board 41 and the base board 42. A part of the skin 35 that is between the base board 41 and the base board 42 constitutes the hinge portion 34 that extends in the vehicular width direction. In other words, a front edge portion of the rear board 31 and a rear edge portion of the front board 32 are connected via the hinge portion 34 that extends in the vehicular width direction. Furthermore, the hinge portion 34 connects the rear board 31 and the front board 32 on a top surface side of the rear board 31 and the front board 32. The top surface side is opposite to a bottom surface side.

In this configuration, the rear board 31 and the front board 32 can pivot around the hinge portion 34. Accordingly, when the tonneau board 30 is not used, the tonneau board 30 can be folded into a smaller size along the hinge portion 34 such that the rear board 31 and the front board 32 overlap each other. A cushioning member 36 is attached to a front edge portion of the base board 41, the hinge portion 34, and a rear edge portion of the base board 42.

The base boards 41 and 42 may be an unitary single member. In such a configuration, a thin portion may be formed between the base boards 41 and 42 as a hinge portion (an integral hinge). Accordingly, the base boards 41 and 42 and the thin portion are formed as the unitary single member.

As illustrated in FIG. 1, elastic members 47 are mounted on rear corners of the rear board 31 and project toward the back door 13. The back door 13 includes a back door trim 17 having a vehicular interior surface. The elastic members 47 contact the vehicular interior surface of the back door trim 17 while the back door 13 is in the closed position (see FIG. 7). According to this configuration, a rear edge of the tonneau board 30 is held by the back door 13 and thus the tonneau board 30 is less likely to make noise caused by vibration when the vehicle is moving.

Board supports 43 are disposed on a front edge portion of the bottom surface 31B of the rear board 31 (the left in FIG. 6). As illustrated in FIG. 2, each board support 43 is a plate-like member having a rectangular top plan view shape. The board support 43 extends from the rear board 31 to the front board 32 (i.e. toward the vehicular front). More specifically, the board support 43 overlaps a part of a rear portion of the front board 32, the hinge portion 34, and a part of the front portion of the rear board 31 in a top plan view of the tonneau board 30.

As illustrated in FIG. 6, the board support 43 includes a support surface 43A on a vehicular front portion of an upper surface thereof. The support surface 43A is under the front board 32 and supports the bottom surface 32B of the front board 32 from the bottom surface side. With the board supports 43, the rear board 31 is less likely to pivot downward around the hinge portion 34 when the back door 13 is opened.

According to this configuration, when the back door 13 is opened, the tonneau board 30 is less likely to be bent such that the hinge portion 34 becomes an apex. Accordingly, the front board 32 and the rear board 31 remain stable and flush with each other.

The cushioning member 36 is between the board supports 43 and the base board 42 of the front board 32. In this configuration, the board supports 43 and the base board 42 do not directly come in contact.

As illustrated in FIG. 2, the front board 32 includes a board support 48 on its bottom surface 32B. The board support 48 is at a middle of a vehicular width dimension of the front board 32. The board support 48 extends from the rear edge portion of the front board 32 to the rear board 31. The board support 48 is configured to support the bottom surface 31B of the rear board 31 from below.

As illustrated in FIG. 2, the board supports 43 are provided near two side edge portions of a vehicular width dimension of the rear board 31, respectively. As illustrated in FIG. 6, a holding member 37 is on a top surface side of the base board 41 and sandwiches the base board 41 with the board support 43. The board support 43 that is disposed on a bottom surface side of the base board 41 is fixed to the holding member 37 with fixing members, such as screws 49 (see FIG. 2).

As illustrated in FIG. 6, the rear board 31 includes through holes 46A (a connect portion) at the vehicular front edge portion. The through holes 46A are formed through a thickness dimension of the rear board 31 (in an upper-lower direction). Connecting members 50 are elongated members (a rope-like member) and include lower end portions that are in the respective through holes 46A.

As illustrated in FIG. 6, each of the through holes 46A includes a through hole 41A formed in the base board 41, a through hole 35A formed in the skin 35, and a through hole 37A formed in the holding member 37. A hook 45 of each board support 43, which will be described later, is inserted in the corresponding through hole 41A from underneath. The holding member 37 includes a protrusions that is inserted in the corresponding through hole 41A from the top.

A portion of the connecting member 50 (a suspender or a strap) other than the lower end portion in the through hole 46A is out of the through hole 46A from the top surface side of the rear board 31 (a surface closer to the back door 13). The connecting members 50 connect the rear board 31 and the back door 13. More specifically, the connecting members 50 connect the rear board 31 and side garnishes 16 of the back door trim 17. According to this configuration, the vehicular rear portion of the tonneau board 30 is lifted when the back door 13 is opened.

The connecting members 50 are made of fibers such as nylon fibers and have flexibility. The connecting members 50 include loops 52 (an upper loop) having a loop-like shape at their upper ends. The loops 52 of the respective connecting members 50 are hung on hooks 14 of the respective side garnishes 16 of the back door 13.

The connecting members 50 include loops 51 (a lower loop) having a loop-like shape at their lower ends (an end of a long dimension of the connecting member). Lower ends of the loops 51 are inserted in the respective through holes 46A from the top of the rear board 31 (the upper side in FIG. 6), namely, the lower end of each loop 51 is inserted in the through hole 35A, the through hole 37A, and through hole 41A in this order.

Figure 5:
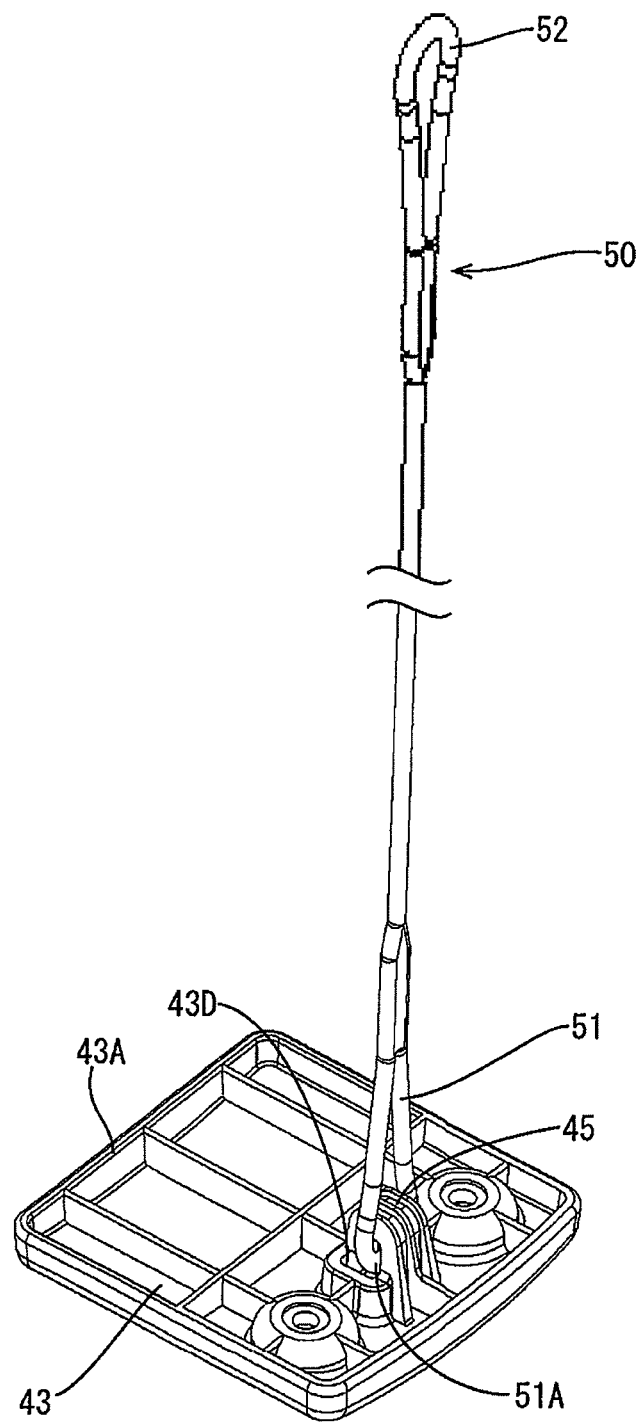
FIG. 5 is a perspective view of a board support and a connecting member.

The board supports 43 include the hooks 45 (a catching portion) that protrude upward from the respective upper surfaces thereof. The hooks 45 are inserted in the respective through holes 46A from underneath of the rear board 31. As illustrated in FIG. 5, each hook 45 extends upward from the upper surface of the board support 43 and curves downward. The hook 45 is configured to catch the loop 51 at a curved portion thereof from the below.

According to this configuration, the lower end portion of each connecting member 50 is connected to the board support 43 via the through hole 46A and the board support 43 is fixed to the front edge portion of the rear board 31. Namely, the lower end portions of the connecting members 50 are indirectly connected to the front edge portion of the rear board 31 on the bottom surface side of the rear board 31 via the board supports 43. When the back door 13 is opened, the loops 51 of the connecting members 50 are hung on the hooks 45 of the respective board supports 43 and thus the board supports 43 are lifted upward. Accordingly, the rear board 31 and the rear portion of the front board 32 are lifted upward.

As illustrated in FIG. 6, while the back door 13 is in the closed position, a lowest portion 51A of the loop 51 is slightly below the hook 45, that is, not in contact with the hook 45. When the back door 13 is opened, the lowest portion 51A is lifted up and comes in contact with the hook 45 from below. According to this configuration, even if the length of the connecting member 50 is shorter than a predetermined length due to production errors, the hook 45 is less likely to be lifted upward by the connecting member 50 while the back door 13 is in the closed position. Accordingly, the rear board 31 is less likely to be lifted when the back door 13 is in the closed position.

Each of the board supports 43 includes a through hole 43D in a portion thereof under the hook 45, and each through hole 43D is through a thickness dimension of the board supports 43 (in the upper-lower direction). More specifically, the hook 45 has a shape projecting upward from a hole edge of the through hole 43D and extending across the through hole 43D and further extending downward. The lowest portion 51A is positioned above the through hole 43D. If the length of the connecting member 50 may be greater than a predetermined length in a manufacturing process, an extra portion of the connecting member 50 may be positioned in the through hole 43D and thus the connecting member 50 is less likely to be loose. According to this configuration, aesthetic design of the tonneau board 30 is not impaired by the loose connecting members 50. In this embodiment, space is provided above and below the lowest portion 51A of the loop 51 and thus dimensional error of the connecting member 50 is cancelled out.

The length of the connecting member 50 may be altered as appropriate. For example, as indicated by two-dot chain line in FIG. 6, a lowest portion 51B of the loop 51 may be above the through hole 43D and in contact with a lower surface of the hook 45 while the back door 13 is in the closed position. Namely, the loop 51 may be hung on the hook 45 to be in contact with the hook 45 while the back door 13 is in the closed position.

In this embodiment, to connect the loop 51 to the hook 45, the loop 51 is inserted through the through hole 46A from the top surface side and toward the bottom surface side of the rear board 31 and hung on the hook 45. The board support 43 is then fixed to the back surface of the base board 41.

The rear board 31 is lifted up by the back door 13 via the connecting members 50 when the back door 13 is opened. The connecting members 50 are connected at the vehicular front portion of the rear board 31. Specifically, as illustrated in FIG. 7, each of the connecting members 50 is connected at a portion of the rear board 31 that is away from the hinge portion 34 by a distance L1 in the vehicular front-rear direction. The distance L1 is a distance ranging from the hinge portion 34 to a point of application of force P on the rear board 31 to which a force from the back door 13 is applied via the connecting members 50. The portion of the rear board 31 where each connecting member 50 is connected is the point of application of force on the rear board 31. The distance L1 extending in the vehicular front-rear direction is smaller than a distance L2 that is a distance extending in the vehicular front-rear direction and ranging from a center of gravity G1 of the rear board 31 to the hinge portion 34. In this configuration, an upward rotary moment around the hinge portion 34 acting on the rear board 31 decreases.

According to this configuration, the rear board 31 is less likely to pivot upward around the hinge portion 34 when the back door 13 is opened. As a result, as illustrated in FIG. 8, the rear board 31 and the rear portion of the front board 32 are lifted together when the back door 13 is opened. Namely, the front and rear boards 32 and 31 pivot upward around the shafts 33 as the center of rotation.

A tonneau board 3 in FIG. 9 is a comparative example of the tonneau board 30. As illustrated in FIG. 9, if lower end portions of connecting members 150 are connected to a vehicular rear portion of a rear board 131, the rear board 131 is more likely to pivot upward around the hinge portion 34 when the back door 13 is opened. In this configuration, although the rear board 131 is lifted up, the front board 32 is not lifted.

According to the configuration of the comparative example, it is difficult to see and check a lower space S2 under the front board 32 and thus it is difficult to see luggage placed on the deck board 18. In contrast, as illustrated in FIG. 8, the front board 32 is lifted up together with the rear board 31 effectively according to the embodiment of the present technology. Therefore, when the luggage space 10 is viewed from an upper and rear side of the vehicle, the lower space S2 under the front board 32 is clearly visible and luggage is easily put in and taken out from the lower space S2.

In this embodiment, the vehicular front portion of the rear board 31 is a portion of the rear board 31 located forward relative to a line parallel to the vehicular width direction and passing through the center of gravity G1 of the rear board 31. Namely, the vehicular front portion of the rear board 31 has an area ranging from a middle of a vehicular front-rear dimension of the rear board 31 to the vehicular front edge of the rear board 31.

The loops 51 of the connecting members 50 are connected to the vehicular front edge portion of the rear board 31. More specifically, as illustrated in FIG. 7, the vehicular front portion of the rear board 31 includes the vehicular front edge portion to which the loops 51 are connected. The vehicular front edge portion of the rear board 31 has an area ranging from the front edge of the rear board 31 to the middle of the distance L2.

With the loops 51 of the connecting members 50 connected to the vehicular front edge portion of the rear board 31, the loops 51 of the connecting members 50 are disposed close to the hinge portion 34. According to this configuration, when the back door 13 is opened, the rear board 31 is less likely to pivot upward around the hinge portion 34 as the center of rotation. Namely, the rear board 31 and the front board 32 are lifted together effectively.

The tonneau board 30 includes the board supports 43 disposed in the vehicular front portion on the bottom surface 31B side of the rear board 31. The board supports 43 extend from the vehicular front portion of the rear board 31 to the front board 32 and are configured to support the front board 32 from underneath of the front board 32. The connecting members 50 include the loops 51 that are connected to the respective board supports 43.

With the connecting members 50 connected to the respective board supports 43, the board supports 43 are lifted upward via the connecting members 50 when the back door 13 is opened. The board supports 43 also support the bottom surface 32B of the front board 32 and therefore, an upward force is applied to the front board 32 via the board supports 43 when the board supports 43 are lifted by the back door 13 via the connecting members 50. Accordingly, the vehicular rear portion of the front board 32 is more properly lifted.

The through holes 46A are formed in the vehicular front portion of the rear board 31 so as to be through the thickness dimension of the rear board 31 (in the upper-lower direction). The lower end portions of the connecting members 50 are in the corresponding through holes 46A that are the connect portions of the rear board 31.

According to this configuration, the lower end portions of the connecting members 50 (a connection between the board support and the connecting member) are less likely to be seen from the top side (the upper side) of the rear board 31. Accordingly, aesthetic design of the tonneau board 30 is enhanced.

Other Embodiments

The present technology is not limited to the description as described above with reference to the drawings. The technology described therein may include following embodiments.

(1) The number of boards included in the tonneau board 30 is not limited to two as described in the above embodiment. The tonneau board 30 may include three boards or more.

(2) The tonneau board 30 does not necessarily include the shafts 33 that are fitted in the recessed portions 12 of the respective side trims 11 and the shafts 33 may be omitted.

(3) The lower portions of the connecting members 50 may be connected to the rear board 31 on the upper side of the rear board 31. Further, the rear board 31 may not include the board supports 43 and the lower end portions of the connecting members 50 may be directly connected to the base board 41.

(4) Each of the through holes 46A does not necessarily include the through holes 35A, 37A, and 41A. The through hole 46A may be any hole as long as the hole extends through the rear board 31 in the vertical direction.

(5) The board supports 43 may be mounted to the rear board 31 with other components in between as long as the board supports 43 are on the bottom surface side of the rear board 31. The board supports 43 may support the front board 32 via other components.

The invention claimed is:

1. A tonneau board used in a luggage space and movable according to opening and closing of a back door of a vehicle, the tonneau board comprising:
 a first board to be disposed in front of the back door and including a connect portion in a vehicular front portion thereof;
 a hinge portion;
 a second board being in front of the first board and connected to the first board via the hinge portion to be pivotable around the hinge portion; and
 an elongated connecting member configured to connect the first board and the back door, the connecting member including an end portion that is connected to the vehicular front portion of the first board via the connect portion.

2. The tonneau board according to claim 1, wherein
 the vehicular front portion of the first board includes a vehicular front edge portion, and
 the vehicular front edge portion includes the connect portion.

3. The tonneau board according to claim 1, further comprising a board support disposed in the vehicular front portion on a bottom surface side of the first board, the board support extending from the vehicular front portion of the first board to the second board to support the second board from a bottom surface side of the second board, wherein
 the end portion of the connecting member is connected to the board support.

4. The tonneau board according to claim 3, wherein
 the connect portion is a through hole that is through the first board in an upper-lower direction, and
 the end portion of the connecting member is in the through hole.

5. The tonneau board according to claim 1, wherein the vehicular front portion of the first board has an area ranging from a middle of a vehicular front-rear dimension of the first board to a vehicular front edge of the first board.

6. The tonneau board according to claim 5, wherein the vehicular front portion of the first board includes a vehicular front edge portion, the vehicular front edge portion having an area ranging from a middle of a vehicular front-rear dimension of the vehicular front portion to the vehicular front edge of the first board, the vehicular front edge portion including the connect portion.

7. The tonneau board according to claim 3, wherein
 the hinge portion connects the first board and the second board on a top surface side of the first board and the second board, and
 the top surface side is opposite to the bottom surface side.

8. The tonneau board according to claim 3, further comprising a holding member on a top surface side of the first board, the holding member sandwiching the first board with the board support, wherein
 the board support is fixed to the holding member.

9. The tonneau board according to claim 4, wherein
 the board support includes a catching portion that is in the through hole and connected to the end portion of the connecting member.

10. The tonneau board according to claim 9, wherein
 the catching portion of the board support is a hook, and
 the end portion of the connecting member is a loop.

11. The tonneau board according to claim 3, wherein the board support overlaps a part of a vehicular rear portion of the second board, the hinge portion, and a part of the vehicular front portion of the first board including the connect portion.

* * * * *